United States Patent
Fujii et al.

(10) Patent No.: US 9,550,411 B2
(45) Date of Patent: Jan. 24, 2017

(54) AUTOMOTIVE WINDOW GLASS, METHOD FOR ATTACHING A MOLDING, AND METHOD FOR MANUFACTURING AUTOMOTIVE WINDOW GLASS

(71) Applicant: Central Glass Co., Ltd., Ube, Yamaguchi (JP)

(72) Inventors: Kazuhiko Fujii, Matsusaka (JP); Takao Horie, Matsusaka (JP)

(73) Assignee: Central Glass Co., Ltd., Ube (JP)

( * ) Notice: Subject to any disclaimer, the term of this patent is extended or adjusted under 35 U.S.C. 154(b) by 52 days.

(21) Appl. No.: 14/547,401

(22) Filed: Nov. 19, 2014

(65) Prior Publication Data

US 2015/0137551 A1    May 21, 2015

(30) Foreign Application Priority Data

Nov. 21, 2013   (JP) ................ 2013-240944

(51) Int. Cl.
*B60J 1/00* (2006.01)
*B60J 10/02* (2006.01)

(52) U.S. Cl.
CPC ............... *B60J 10/02* (2013.01); *B60J 1/005* (2013.01); *B60J 10/70* (2016.02); *Y10T 29/49* (2015.01)

(58) Field of Classification Search
CPC ............. B60J 10/02; B60J 10/70; B60J 1/005
USPC .......... 296/201, 146.15, 93, 96.21; 29/897.2
See application file for complete search history.

(56) References Cited

U.S. PATENT DOCUMENTS

2008/0012383 A1*  1/2008  Larson .................... B60J 1/004
296/93

FOREIGN PATENT DOCUMENTS

JP           6-297942 A     10/1994

* cited by examiner

*Primary Examiner* — Joseph D Pape
(74) *Attorney, Agent, or Firm* — Crowell & Moring LLP

(57) ABSTRACT

Automotive window glass to which a molding for sealing space between a car body and the window glass is to be attached, the window glass including, an attachment starting point mark indicating an attachment starting point of the molding, and at least one of a termination starting point mark and a termination last point mark in a specification range in which a termination of the molding, of which an attachment to the window glass being started from the attachment starting point, is to be placed.

2 Claims, 7 Drawing Sheets

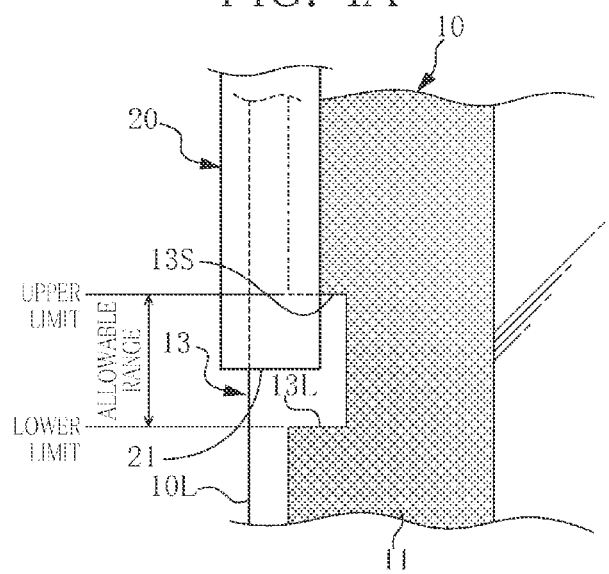
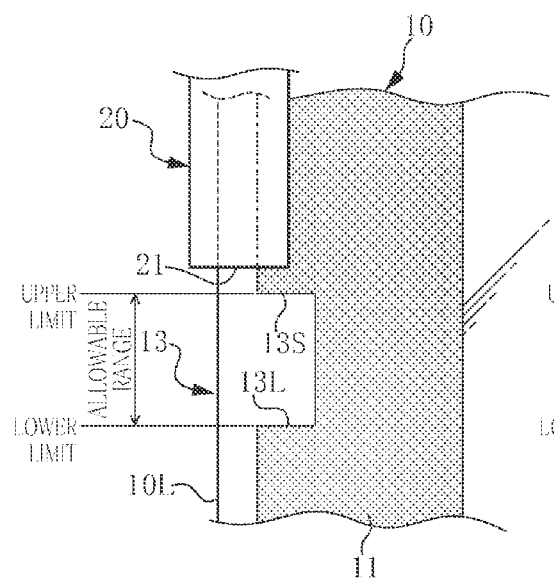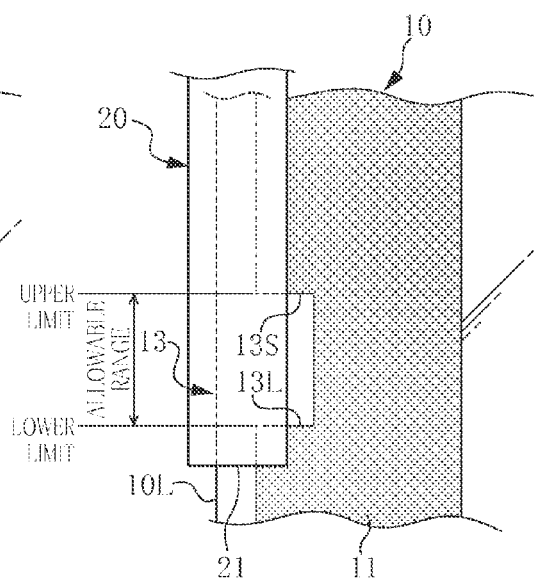

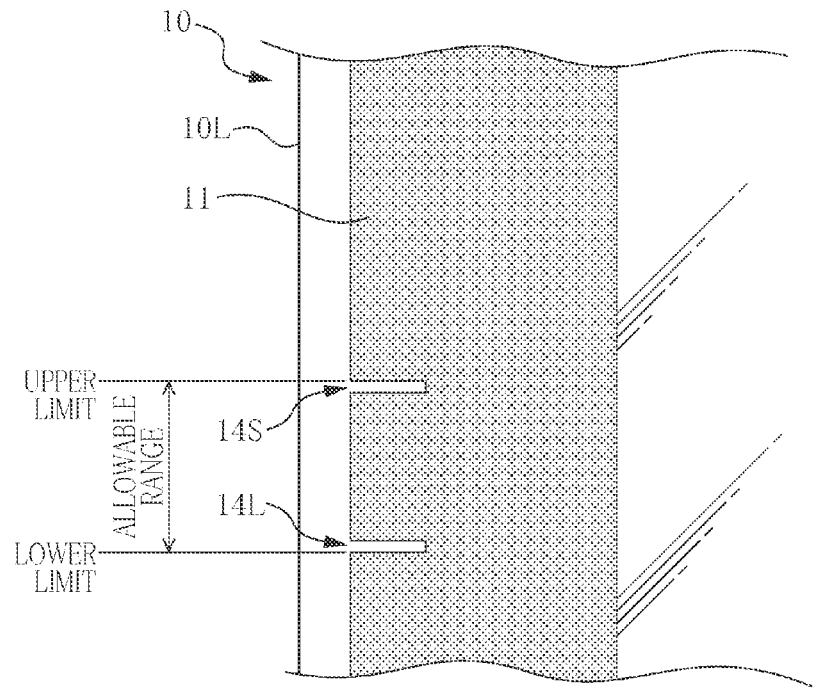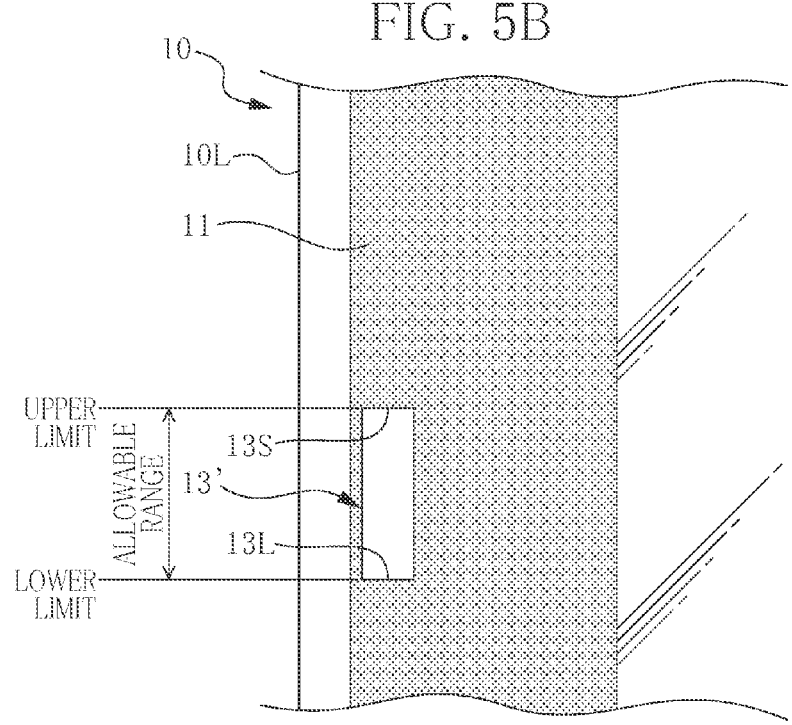

AUTOMOTIVE WINDOW GLASS, METHOD FOR ATTACHING A MOLDING, AND METHOD FOR MANUFACTURING AUTOMOTIVE WINDOW GLASS

BACKGROUND OF THE INVENTION

Field of the Invention

This invention relates to automotive window glass with an outer periphery to which a molding for sealing space between a car body and the window glass is to be attached, method for attaching the molding, and method for manufacturing the automotive window glass.

Related Art

A member called a molding is attached to the outer periphery of automotive window glass for sealing space between the window glass and a car body. To determine the position of such a molding easily while the molding is to be fitted to window glass along its outer periphery, markings have been placed on both the window glass and the molding (see Japanese Unexamined Patent Application, Publication No. H06-297942).

SUMMARY OF THE INVENTION

However, the technique of the publication cannot check the occurrence of an improper length of the molding or a misaligned marking on the molding.

A problem to be solved by this invention is to provide automotive window glass, method for attaching molding, and method for manufacturing automotive window glass contributing to placement of a molding in a right position relative to the automotive window glass and contributing to checking whether the molding has a proper length.

This invention solves the aforementioned problem by the following means.

The first aspect of the present invention, there is provided automotive window glass to which a molding for sealing space between a car body and the window glass is to be attached, the window glass comprising: an attachment starting point mark indicating an attachment starting point of the molding; and at least one of a termination starting point mark and a termination last point mark of a specification range in which a termination of the molding, of which an attachment to the window glass, being started from the attachment starting point is to be placed.

The automotive window glass may have both the termination starting point mark and the termination last point mark.

The termination starting point mark and the termination last point mark may be normal to an outer periphery of the automotive window glass.

The termination starting point mark and the termination last point mark may be formed in a black border on the automotive window glass.

The termination starting point mark and the termination last point mark may be formed in an outer circumference of the black border.

The termination starting point mark and the termination last point mark may form sides of a multi-sided shape.

The second aspect of the present invention, there is provided a method for attaching a molding for sealing space between automotive window glass and a car body to the automotive window glass, the method comprising the steps of, forming, to the automotive window glass, an attachment starting point mark indicating an attachment starting point of the molding, and a termination range mark indicating a termination specification range of a termination of the molding of which an attachment to the window glass being started from the attachment starting point, forming a molding including a molding-side mark corresponding to the attachment starting point mark, starting attachment of the molding to the automotive window glass, such that the molding-side mark of the molding coincides with the attachment starting point mark of the automotive window glass and determining whether the termination of the molding is within the termination specification range, by visually checking a position of the termination of the molding relative to the termination range mark.

The third aspect of the present invention, there is provided a method for manufacturing automotive window glass, to which a molding for sealing space between the automotive window glass and a car body is attached, the method comprising the step of, forming an attachment starting point mark indicating an attachment starting point of the molding, and a termination range mark indicating a termination specification range of a termination of the molding of which an attachment to the window glass being started from the attachment starting point, through masking while printing a black border.

The aforementioned structures can be modified, where appropriate. At least some of these structures can be replaced by a different structure.

This invention can provide automotive window glass contributing to placement of a molding in a right position relative to the automotive window glass and contributing to checking whether the molding has a proper length.

BRIEF DESCRIPTION OF THE DRAWINGS

FIG. 4A shows a relationship between the termination range mark and a termination of the molding, FIG. 4B shows a relationship between the termination range mark and a termination of the molding, FIG. 4C shows a relationship between the termination range mark and a termination of the molding, FIG. 5A shows different examples of indication of a termination specification range, FIG. 5B shows different examples of indication of a termination specification range.

DETAILED DESCRIPTION OF THE INVENTION

Figure 1:
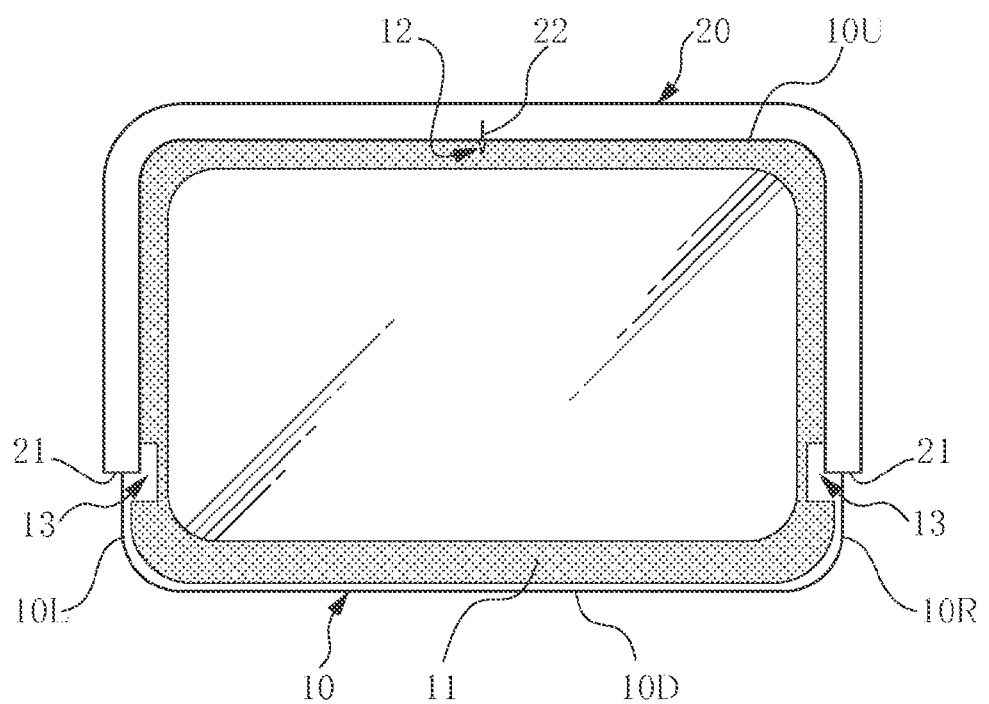
FIG. 1 shows a condition where a molding is attached to window glass to which a first embodiment of this invention is applied.

Embodiments of this invention are described below by referring to the drawings.

(First Embodiment)

FIG. 1 shows a condition where a molding is attached to window glass to which a first embodiment of this invention is applied.

Figure 2A:
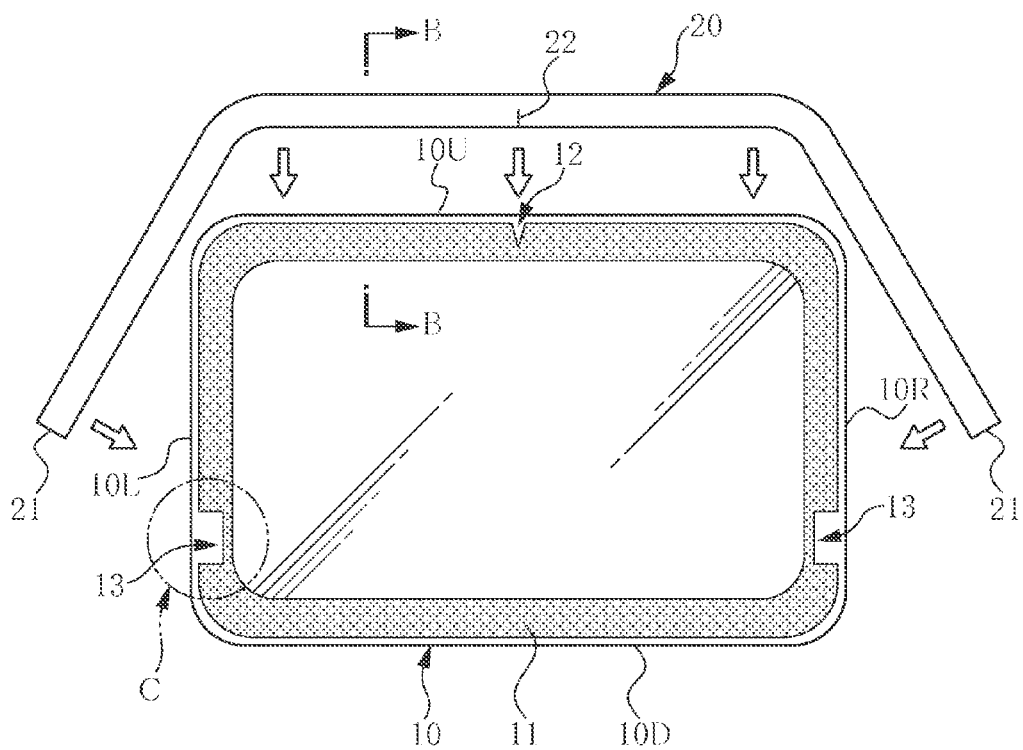
FIG. 2A is a front view showing how the molding is attached to the window glass.
Figure 2B:
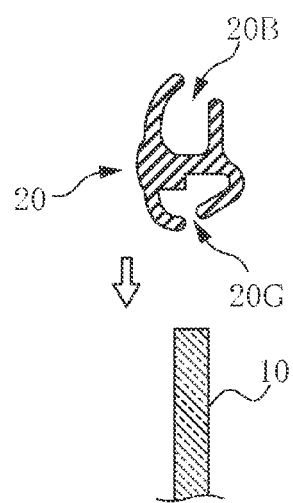
FIG. 2B is a sectional view taken along B-B of FIG. 2A showing how the molding is attached to the window glass.

FIG. 2A is a front view showing how a molding 20 is attached to window glass 10. FIG. 2B is a sectional view taken along B-B of FIG. 2A showing how a molding 20 is attached to window glass 10.

Figure 3:
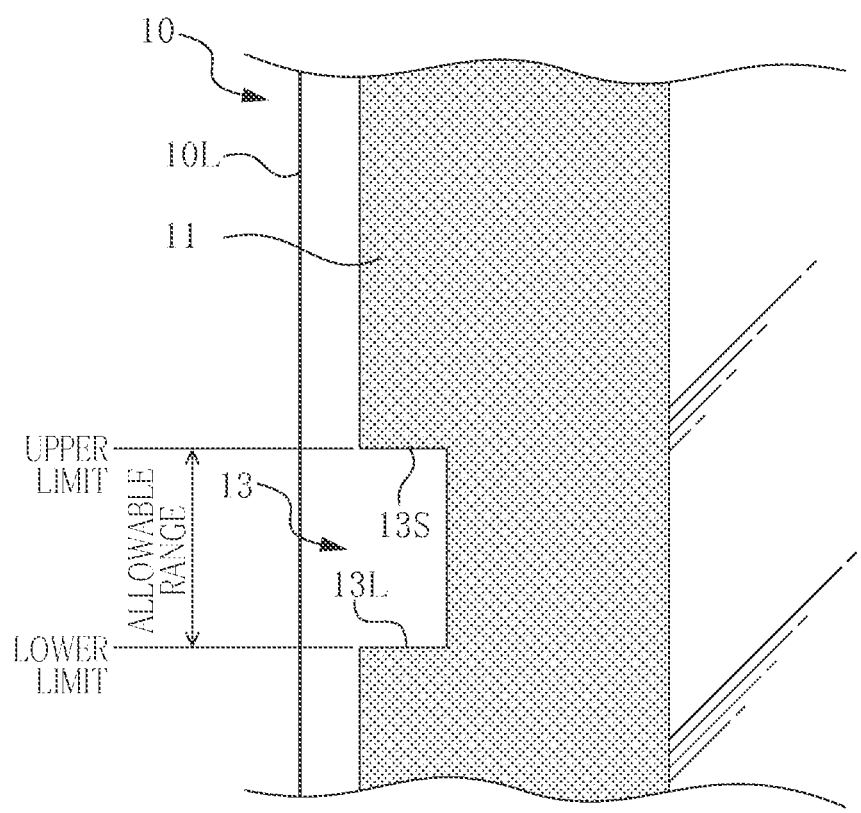
FIG. 3 is an enlarged view of an area C of FIG. 2 showing a termination range mark for the molding formed in the window glass.

FIG. 3 is an enlarged view of an area C of FIG. 2A showing a termination range mark 13 in the window glass 10.

FIG. 4 shows a relationship between the termination range mark 13 and a termination 21 of the molding 20.

The window glass 10 of FIG. 1 is a windshield arranged on the front side of an automobile. This invention is applicable not only to a windshield but also to side window glass and rear window glass.

The molding 20 is attached to a given range of the outer periphery of the window glass 10. The window glass 10 with the attached molding 20 is assembled into the body of an automobile not shown in the drawings in an automobile assembly line.

As shown in FIGS. 1, and 2A, the window glass 10 is rimmed with a black border 11 in the form of a frame that runs around the inside of the outer periphery of the window glass 10. The black border 11 prevents an adhesive for adhesive contact of the window glass 10 to a car body from deteriorating due to light.

The black border 11 is given an attachment starting point mark 12 used for determining the position of the molding 20 during attachment of the molding 20, and the termination range mark 13 (a termination starting point mark 13S and a termination last point mark 13L) indicating a termination specification range for the molding 20 described later. The attachment starting point mark 12 and the termination range mark 13 are described in detail later.

As shown in FIG. 1, the molding 20 of this embodiment is attached to an upper side 10U, and a lateral side 10L and a lateral side 10R except their parts near a lower side. A lower side 10D and the parts of the lateral sides 10L and 10R near the lower side 10D of the window glass 10 to which the molding 20 is not to be attached are covered with a cowl not shown in the drawings to be attached to the window glass 10 while the window glass 10 is incorporated to the car body.

Thus, the termination 21 of the molding 20 of this embodiment should be within a certain range (termination specification range) in the vertical direction of the drawings. Specifically, the termination 21 of the molding 20 below the termination specification range (near the lower side 10D of the window glass 10) may interfere with the cowl, so that attachment of the cowl may be hindered.

Meanwhile, the termination 21 of the molding 20 above the termination specification range (far from the lower side 10D of the window glass 10) may generate a gap between the molding 20 and the cowl.

As shown in FIG. 2B, the molding 20 has a glass fitting part 20G to fit the window glass 10 so as to pinch the window glass 10, and a car body fitting part 20B to fit a member belonging to the car body. The molding 20 is made of a flexible material such as PVC (polyvinyl chloride). The molding 20 is one continuous bar having a length determined such that the termination 21 of the molding 20 is placed within the termination specification range if the molding 20 is attached to the window glass 10 correctly.

The molding 20 is attached to the window glass 10 by coating the glass fitting part 20G of the molding 20 with an adhesive and fitting the molding 20 such that the outer periphery of the window glass 10 (upper side 10U and lateral sides 10L and 10R) is inserted in the molding 20, as shown in FIG. 2A.

The window glass 10 is given the attachment starting point mark 12 in a part of the upper side 10U in the center of the width direction of the window glass 10. The molding 20 is given a center mark 22 to correspond to the attachment starting point mark 12.

The attachment starting point mark 12 in the window glass 10 is an inverted triangular indication cut out of the black border 11 printed on the window glass 10. The base of the triangle is on the outer edge side. The attachment starting point mark 12 is formed by masking while the black border 11 is printed. The center mark 22 on the molding 20 is a linear pattern indication orthogonal to an axis direction (longitudinal direction) of the molding 20 and is formed in the center of the axis direction.

As shown in FIG. 2A, during attachment of the molding 20 to the window glass 10, the center mark 22 on the molding 20 is aligned with the attachment starting point mark 12 in the window glass 10. This allows the molding 20 to be attached to a given position of the window glass 10.

If an error not falling within an allowable amount is caused in the length of the molding 20 or the position of the center mark 22, for example, the position of the termination 21 of the molding 20 may go out of the termination specification range even if the molding 20 is attached to the window glass 10 while the center mark 22 is accurately aligned with the attachment starting point mark 12 in the window glass 10.

Therefore, the termination range mark 13 indicating the termination specification range for the molding 20 is formed in the window glass 10. The termination range mark 13 is formed in each of the right and left lateral sides 10R and 10L of the window glass 10.

As shown FIG. 3 corresponding to an enlarged view of the area C of FIG. 2A, the termination range mark 13 is a rectangular indication cut out of the black border 11 printed on the window glass 10 so as to expose the black border 11 toward the outer edge. The termination range mark 13 is formed by masking while the black border 11 is printed.

The termination range mark 13 has the termination starting point mark 13S and the termination last point mark 13L corresponding to the upper side and the lower side of the rectangular cutout, respectively. The termination starting point mark 13S and the termination last point mark 13L are each at right angles (normal) to the lateral sides 10L and 10R forming the outer periphery of the window glass 10. The termination starting point mark 13S in the upper part of FIG. 3 indicates an upper limit of the position of the termination 21 of the molding 20 (allowable limit of a short molding 20). The termination last point mark 13L in the lower part of FIG. 3 indicates a lower limit of the position of the termination 21 of the molding 20 (allowable limit of a long molding 20).

Thus, by visually checking the position of the termination 21 of the molding 20 relative to the termination range mark 13 after the molding 20 is attached, it can be determined whether the termination 21 of the molding 20 is within the termination specification range.

Specifically, if the termination 21 of the molding 20 is between the termination starting point mark 13S and the termination last point mark 13L as shown in FIG. 4A, the termination 21 of the molding 20 can be determined to be within the termination specification range (allowable range).

If the termination 21 of the molding 20 is above the termination starting point mark 13S of the termination range mark 13 as shown in FIG. 4B or below the termination last point mark 13L of the termination range mark 13 as shown in FIG. 4C, the termination 21 of the molding 20 can be determined not to fall within the termination specification range. Thus, action can be taken such as removal or repair of the window glass 10.

In this embodiment, the molding 20 is attached to the window glass 10 while the center mark 22 in the center of the axial direction of the molding 20 is aligned with the attachment starting point mark 12 in the center of the width direction of the window glass 10. Thus, the termination range mark 13 is formed in each of the right and left lateral sides 10R and 10L of the window glass 10 to determine the position of the termination 21 of the molding 20 at each of the right and left lateral sides 10R and 10L.

As described above, in this embodiment, only by visually checking the position of the termination 21 of the molding 20 relative to the termination range mark 13 after the molding 20 is attached to the window glass 10, it can be determined at once whether the attached molding 20.

An indication of the termination specification range for the molding 20 is not limited to the termination range mark 13 described above. FIG. 5 shows different examples of indication of the termination specification range.

FIG. 5A shows an upper limit line 14S and a lower limit line 14L formed independently. The upper and lower limit lines 14S and 14L indicate an upper limit and a lower limit of the position of the termination 21 of the molding 20, respectively. The upper and lower limit lines 14S and 14L are formed by cutting linear patterns out of the black border 11.

FIG. 5B shows a rectangular termination range mark 13' in the black border 11 not exposed to an edge of the black border 11. In this case, like in the aforementioned embodiment, the termination starting point mark 13S in the upper part of FIG. 5B indicates an upper limit of the position of the termination 21 of the molding 20 (allowable limit of a short molding 20). The termination last point mark 13L in the lower part of FIG. 5B indicates a lower limit of the position of the termination 21 of the molding 20 (allowable limit of a long molding 20).

(Second Embodiment)

Figure 6:
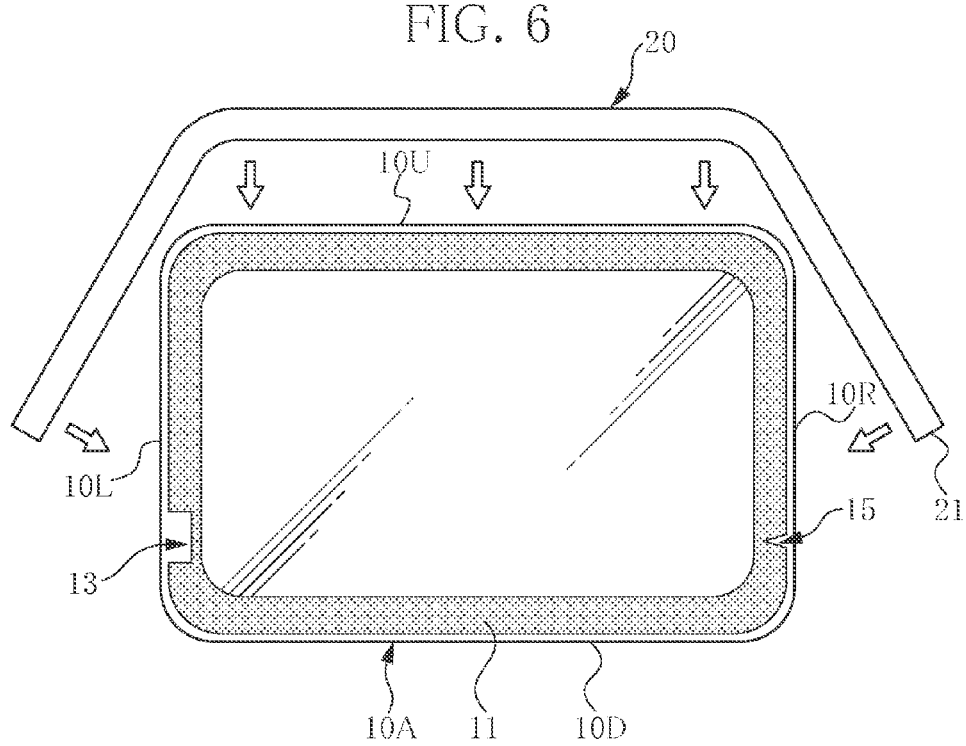
FIG. 6 shows how a molding is attached to window glass of a second embodiment of this invention.

A second embodiment of this invention shown in FIG. 6 is described next.

FIG. 6 is a front view showing how a molding 20 is attached to window glass 10A of the second embodiment. Constituting elements same as those of the aforementioned embodiment are identified by the same signs in FIG. 6 and will not be described.

The window glass 10A of FIG. 6 is given an attachment starting point mark 15 formed in one (right side of FIG. 6) lateral side 10R in a part near the lower side 10D and the termination range mark 13 formed in the opposite (left side of FIG. 6) lateral side 10L in a part near the lower side 10D.

Like the attachment starting point mark 12 of the first embodiment described above, the attachment starting point mark 15 is an inverted triangular indication cut out of the black border 11 printed on the window glass 10A. The base of the triangle is on the outer edge side.

For attachment of the molding 20, while one (right side of FIG. 6) termination 21 of the molding 20 is aligned with the attachment starting point mark 15 in the window glass 10A, the molding 20 is fitted around the window glass 10A from this termination 21 such that the outer periphery of the window glass 10A (upper side 10U and lateral sides 10L and 10R) is inserted in the molding 20. After the attachment, the position of the opposite (left side of FIG. 6) termination 21 relative to the termination range mark 13 is checked, so that it can be determined whether the attached molding 20.

This embodiment involves check of the position of the termination 21 of the molding 20 relative to the termination range mark 13 only in one place. This facilitates work relating to the check.

This embodiment achieves the following effects.

(1) In this embodiment, the termination range mark 13 indicating the specification range for the termination 21 of the molding 20 is formed in a position of the window glass 10A corresponding to the termination 21 of the molding 20. Thus, only by visually checking the position of the termination 21 of the molding 20 relative to the termination range mark 13 after the molding 20 is attached to the window glass 10A, it can be determined at once whether the attached molding 20.

(2) The termination starting point mark 13S and the termination last point mark 13L of the termination range mark 13 indicating an allowable limit of the termination 21 of the molding 20 are each a linear pattern indication at right angles to the lateral sides 10L and 10R of the window glass 10A. Thus, the position of the termination 21 of the molding 20 can be determined unambiguously and definitely.

(3) The termination range mark 13 is an indication formed by making a cutout in the black border 11 printed on the window glass 10A. Thus, the indication can be formed easily and achieves excellent visibility.

(4) The termination range mark 13 is formed by making a cutout in the black border 11 such that the black border 11 is exposed toward an outer circumference. Thus, the termination range mark 13 is mostly hidden by the attached molding 20 so that it is not recognized easily.

(Third Embodiment)

Figure 7:
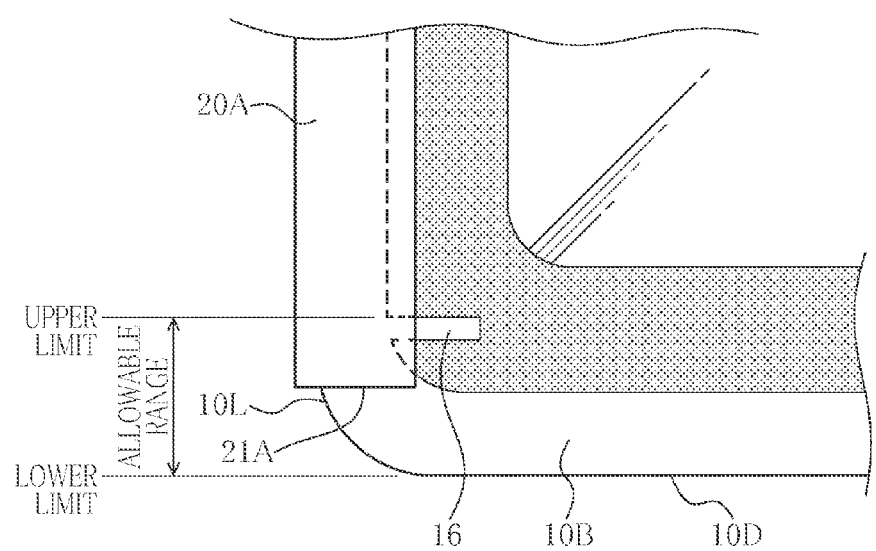
FIG. 7 shows a termination starting point mark formed in window glass of a third embodiment.

A third embodiment of this invention shown in FIG. 7 is described next.

FIG. 7 shows a termination starting point mark 16 formed in window glass 10B of the third embodiment. Constituting elements same as those of the aforementioned embodiments are identified by the same signs in FIG. 7 and will not be described.

The window glass 10B of FIG. 7 is given the termination starting point mark 16 formed in one lateral side 10L in a part near the lower side 10D. The attachment starting point mark 15 of this embodiment is the same as the aforementioned attachment starting point mark 15 of the second embodiment. A molding is attached by the same method as that of the second embodiment. Thus, the attachment starting point mark 15 and the method of attachment will not be described.

A molding 20A of this embodiment differs from those of the first and second embodiments in that a termination 21A of the molding 20A extends as far as to a part near the lower side 10D of the window glass 10B.

The window glass 10B to which the molding 20A is to be attached makes a termination last point reach the lower side 10D, making it impossible to form a termination last point mark.

Thus, in this embodiment, only the termination starting point mark 16 is formed in the part near the lower side 10D. It is determined whether the termination 21A of the molding 20A falls within an allowable range by using an edge of the lower side 10D of the window glass 10B as a termination last point mark.

In this embodiment, the position of the termination 21A of the molding 20A relative to the termination starting point mark 16 is checked, so that it can be determined whether the attached molding 20A.

(Modifications)

This invention is not to be limited to the aforementioned embodiments. Various modifications or changes described below can be devised and these modifications or changes are also within the scope of this invention.

Figure 8:
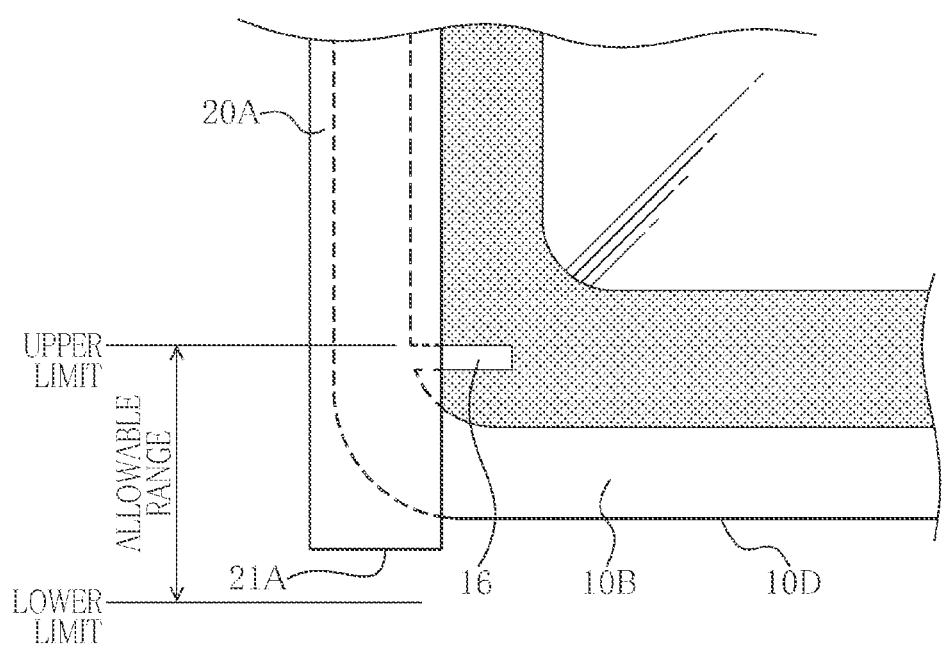
FIG. 8 shows a modification of the third embodiment.

(1) According to a modification of the third embodiment, as shown in FIG. 8, a lower limit of an allowable range may come below an edge of the lower side 10D of the window glass 10B and the termination 21A of the molding 20A may also come below the lower side 10D of the window glass 10B. This also makes it impossible to form a termination last point mark. Meanwhile, in the third embodiment, at least a termination starting point can be checked by forming only the termination starting point mark 16 near the lower side 10D.

(2) In the aforementioned embodiments, the black border 11 is printed on the window glass 10 and the termination range mark 13 is an indication formed by making a cutout in the black border 11. Alternatively, the termination range mark 13 may be an indication such as a rectangular figure or a line described in the aforementioned embodiments to be formed independently of and separately from the black border.

(3) Ceramic paste (such as silver paste used for printing a hot wire or an antenna) with a color different from the black border may be printed on the black border and dried. Then, the black border may be completed by baking in a heating furnace.

Although not described in detail, the embodiments and the modifications can be used in combination, where appropriate. This invention is not to be limited to the aforementioned embodiments.

What is claimed is:

1. A method for attaching a molding for sealing space between automotive window glass and a car body to the automotive window glass, the method comprising the steps of:

forming, to the automotive window glass, an attachment starting point mark indicating an attachment starting point of the molding, and a termination range mark indicating a termination specification range of a location of a termination of the molding after the molding is in an installed position resulting from starting of attachment of the molding to the window glass from the attachment starting point;

forming a molding including a molding-side mark corresponding to the attachment starting point mark;

starting attachment of the molding to the automotive window glass, such that the molding-side mark of the molding coincides with the attachment starting point mark of the automotive window glass; and determining whether the termination of the molding is within the termination specification range, by visually checking a position of the termination of the molding relative to the termination range mark.

2. A method for manufacturing automotive window glass, to which a molding for sealing space between the automotive window glass and a car body is attached, the method comprising the step of:

forming, to the automotive window glass, an attachment starting point mark indicating an attachment starting point of the molding, and a termination range mark indicating a termination specification range of a location of a termination of the molding after the molding is in an installed position resulting from starting of attachment of the molding to the window glass from the attachment starting point, wherein the forming of the attachment starting point mark and the termination range mark is performed by masking a black border while printing the black border.

* * * * *